United States Patent [19]
Conley, Jr.

[11] Patent Number: 5,967,556
[45] Date of Patent: Oct. 19, 1999

[54] METHOD AND SYSTEM FOR GENERATING, STORING AND MANAGING RECORDS

[75] Inventor: Ralph F. Conley, Jr., Miamisburg, Ohio

[73] Assignee: Direct Business Technologies, Inc., Dayton, Ohio

[21] Appl. No.: 08/586,190

[22] Filed: Jan. 16, 1996

[51] Int. Cl.⁶ .............................. B42D 3/18; B42D 1/08; B42D 15/00
[52] U.S. Cl. .............................. 281/29; 283/38; 283/40; 283/94; 402/14
[58] Field of Search .............................. 281/29; 283/37, 283/38, 39, 40, 44, 99; 402/14

[56] References Cited

U.S. PATENT DOCUMENTS

| | | | |
|---|---|---|---|
| 1,529,264 | 3/1925 | Mayers | 229/67.1 |
| 1,585,237 | 5/1926 | Doughty | 229/67.1 |
| 3,257,127 | 6/1966 | Tilton, Jr. | 229/67.1 |
| 3,312,384 | 4/1967 | Heynemann | 229/67.3 |
| 3,839,809 | 10/1974 | Casas et al. | 40/359 |
| 4,549,688 | 10/1985 | Ozmon et al. | 229/1.5 |
| 4,576,328 | 3/1986 | Snider et al. | 229/1.5 |
| 4,602,734 | 7/1986 | Thompson | 229/1.5 |
| 4,743,747 | 5/1988 | Fougere et al. | 235/494 |
| 4,970,984 | 11/1990 | Vazquez | 283/38 X |
| 4,973,086 | 11/1990 | Donnelly et al. | 283/40 X |
| 4,978,143 | 12/1990 | Ericson | 283/34 X |
| 5,020,411 | 6/1991 | Rowan | 89/1.11 |
| 5,085,469 | 2/1992 | Castro | 283/94 |
| 5,241,600 | 8/1993 | Hillis | 380/23 |
| 5,242,197 | 9/1993 | Raynak | 283/37 |
| 5,321,749 | 6/1994 | Virga | 380/18 |
| 5,337,358 | 8/1994 | Axelrod et al. | 380/23 |
| 5,337,361 | 8/1994 | Wang et al. | 380/51 |
| 5,340,158 | 8/1994 | Bartl | 283/94 X |
| 5,384,846 | 1/1995 | Berson et al. | 380/23 |
| 5,420,924 | 5/1995 | Berson et al. | 380/23 |
| 5,613,791 | 3/1997 | Medenica | 402/4 |

FOREIGN PATENT DOCUMENTS

| 9787 | 5/1895 | United Kingdom | 283/37 |
|---|---|---|---|

*Primary Examiner*—Paul A. Bell
*Attorney, Agent, or Firm*—Jacox, Meckstroth & Jenkins

[57] ABSTRACT

A method and system for generating, inventorying, storing and managing records and record forms is disclosed. The record management system and method utilizes a system record generator which generates a plurality of policies, record forms and the like in response to a questionnaire record. Customized record forms and policies are generated and stored in a unique record receiver having indicia for clearly identifying forms therein. A record holder is also provided for storing, inventorying, and managing the record forms used. The method and system are particularly useful for managing and insuring that record forms are completed for employees in a company by providing convenient means for visually identifying record forms, such as employment applications and the like, for ascertaining when one or more forms is missing by the presence of an empty compartment in the record holder.

63 Claims, 9 Drawing Sheets

| 1. Organization Chart | Keep ☐ | Delete ☐ —12 ←14 |
|---|---|---|
| Confusion and low productivity reign when employees don't know to whom they report or to whom they should report various actions or activities. An organization chart serves to streamline channels of communication. (If choosing to keep this policy remember to include your company's organization chart when returning the completed questionnaire.) | | |
| ... | ... | ... |
| 4. Temporary Employees | Keep ☐ —16 | Delete ☐ —17 ←14 |
| Defines a temporary employee. | | |
| 5. "Non-Exempt" & "Exempt" Employees | Keep ☐ | Delete ☐ ←14 |
| Defines non-exempt and exempt employees. | | |
| 6. Anniversary Date | Keep ☐ —30 | Delete ☐ |
| Defines the first day of work as the employee's anniversary date. | | |
| ... | ... | ... |

METHOD AND SYSTEM FOR GENERATING, STORING AND MANAGING RECORDS

BACKGROUND OF THE INVENTION

1. Field of the Invention

This invention relates to a record management system and method and, more particularly, to a system and method for generating customized policies, forms and for providing a record management system for receiving and storing both unused and used record forms.

2. Description of Related Art

In the past, many companies have spent considerable amounts of time, effort and money generating policies and appropriate forms for use in their business. It was not uncommon, for example, to have a single employee fill out numerous forms prior to, during and after employment with the company. Typically, the forms were not organized into a single record receiver. Also, after the forms were used, there was no convenient means for identifying the forms or for storing them for a single employee. For example, for a single employee of the company there would simply be a single folder with any forms associated with that employee simply being situated therein. Typically, there was no way of identifying which forms were in the folder. Also, the forms were not organized into any coherent or convenient order. Unfortunately, this sometimes resulted in forms which were required to be completed to be overlooked.

What is needed therefore, is a record management system and method which will conveniently generate the necessary forms, provide storage for the necessary forms prior to use and subsequently store the necessary forms into a convenient storage receiver.

SUMMARY OF THE INVENTION

It is, therefore, a primary object of this invention to provide a system and method for generating a plurality of policies, record forms and for providing a record management system and method for identifying and storing record forms before and after they are used.

It is also an object of this invention to provide a record management system which comprises storage means for storing record forms and also providing means for concealing some information, such as confidential information, while revealing other information, such as non-confidential information.

It is another object of this invention to provide a system and method for generating customized policies, forms, storage and retrieval devices for such customized forms.

In one aspect, this invention comprises a record holder consisting of a container comprising a plurality of compartments, a first indicia associated with one of the plurality of compartments, a second indicia associated with another of the plurality of compartments, a cover secured to the container for closing said plurality of compartments such that the first indicia is visible while the second indicia is concealed.

In another aspect, this invention comprises a file management system consisting of storage means for storing an inventory of a plurality of forms into a predetermined order, where the storage means comprises a plurality of separators for separating the plurality of forms, a first plurality of indicia associated with the plurality of separators, respectively form holder means for holding some of the plurality of forms, the form holder means comprising a second plurality of separators for separating the some of the plurality of forms, and a second plurality of indicia associated with the second plurality of separators, wherein the second plurality of indicia correspond to the first plurality of indicia.

In still another aspect this invention, this invention comprises a method for filing a plurality of forms in a form management system, storing an inventory of the plurality of forms in a first storage container, the first storage container comprising a plurality of compartments separated by a plurality of compartment separators, respectively, each of the plurality of compartment separators comprising at least one first indicia, using at least one of the plurality of forms; and storing the at least one of the plurality of forms used during the using step in a second storage container comprising a second plurality of compartments separated by a second plurality of compartment separators, each of the second plurality of compartment separators comprising at least one second indicia which generally corresponds to the first indicia.

In yet another aspect of this invention, this invention comprises a form management system and method consisting of a plurality of kits each comprising a plurality of forms, at least one of the plurality of kits comprising a form identifier associated therewith, a storage device for organizing the plurality of forms into separate storage device compartments, at least one of the storage device compartments comprising a second form identifier associated therewith, a record holder for organizing the plurality of forms into separate form holder compartments, at least one of the record holder compartments comprising a third form identifier associated therewith, the form identifier, the second form identifier and the third form identifier comprising at least one common characteristic.

In yet another aspect of this invention, this invention comprises a method for managing records comprising the steps of generating a plurality of management forms, situating the plurality of management forms into a record receiver having an identifier for identifying at least one of the plurality of management forms, using the at least one of the plurality of management forms, organizing those of the plurality of management forms utilized in the using step into a predetermined order in a record holder.

These and other objects and advantages of the invention will be apparent from the following description, the accompanying drawings and the appended claims.

DETAILED DESCRIPTION OF THE INVENTION

Figure 1:
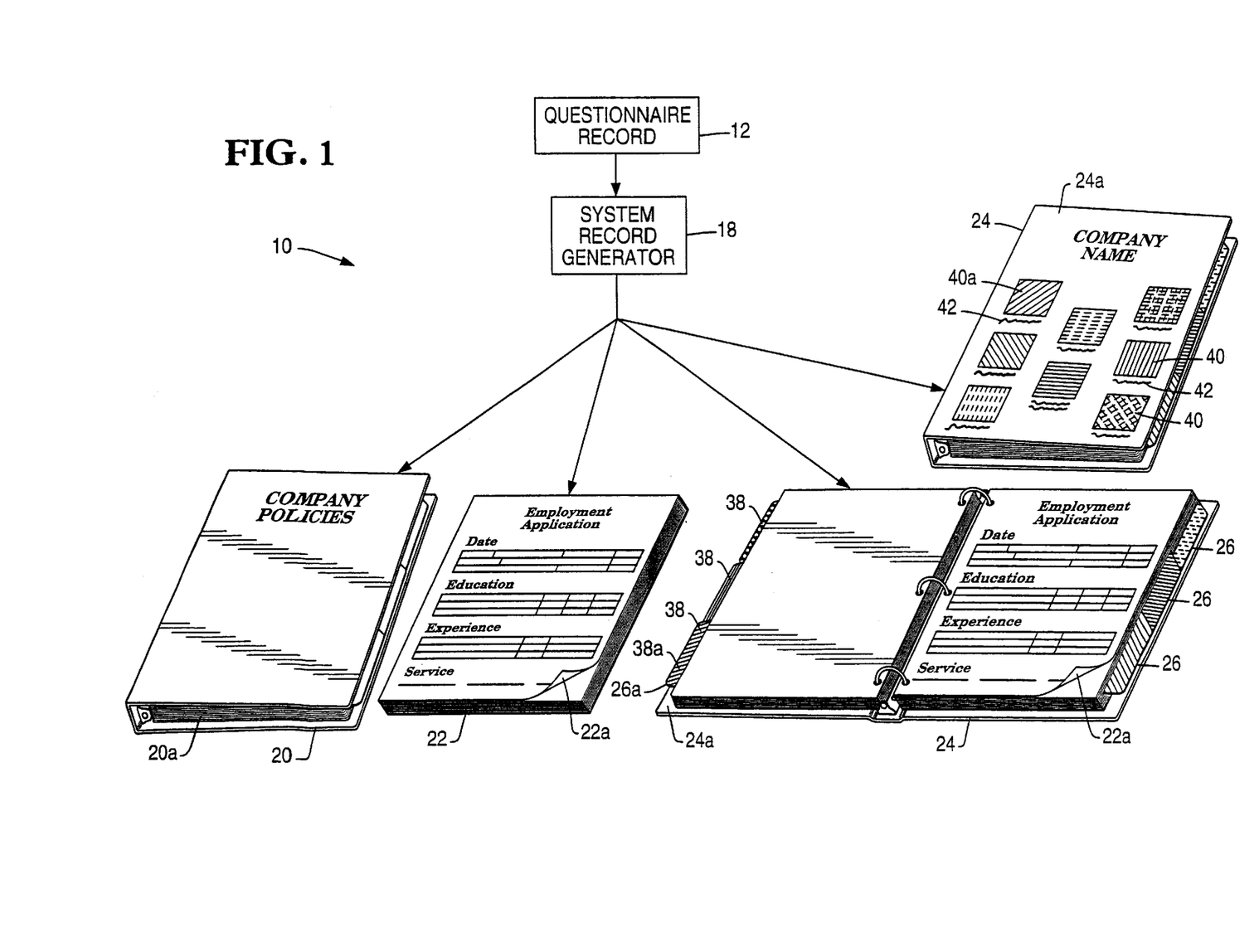
FIG. 1 is a view showing a system for generating company policies, record forms and a record receiver.
Figure 2:
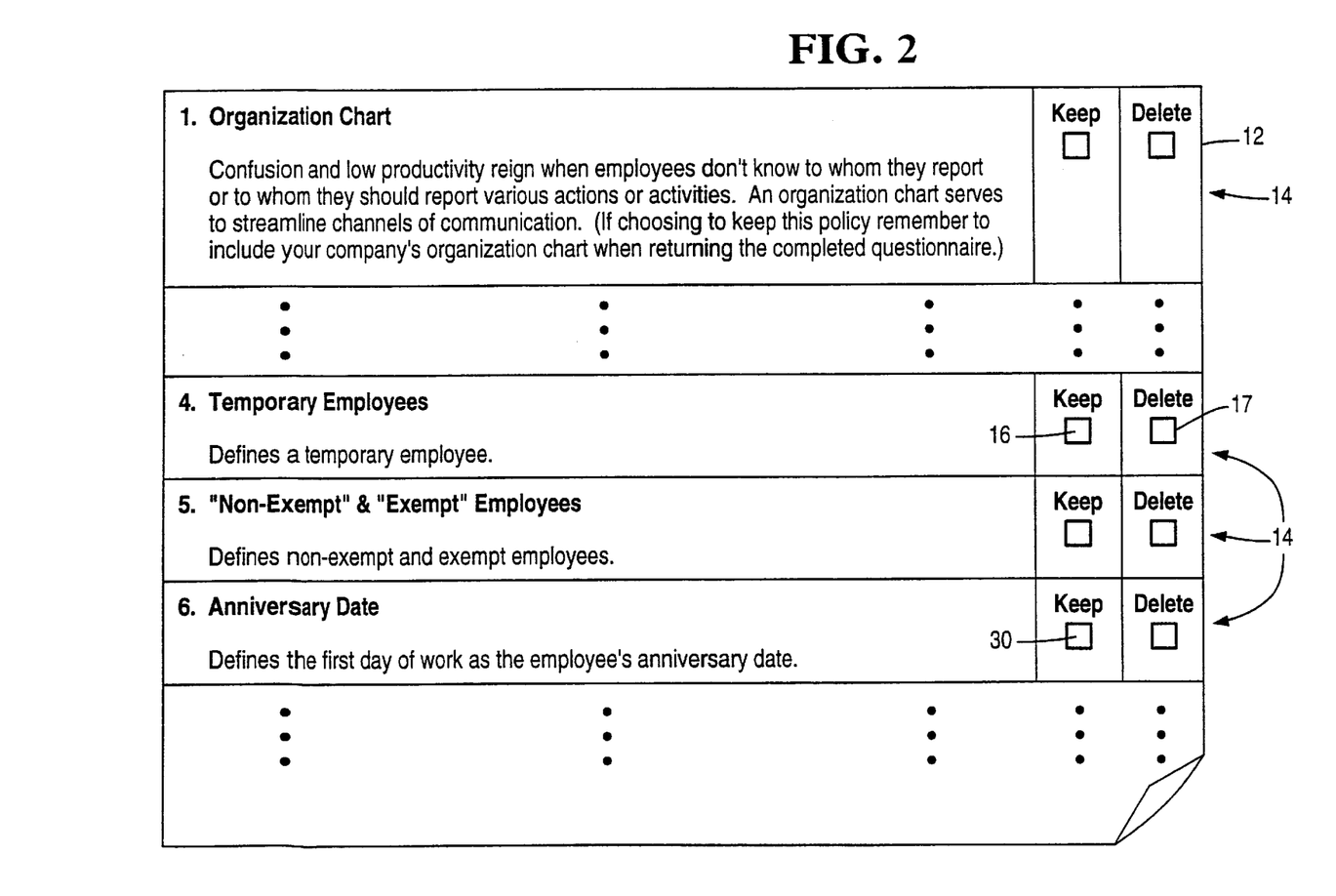
FIG. 2 is a view of a questionnaire record for use in the present invention.

Referring now to FIG. 1, a system for generating and managing a plurality of policies and records is shown. The system comprises a questionnaire record 12. As best illustrated in FIG. 2, the questionnaire record 12 comprises a plurality of record information areas 14 which provide a plurality of questions to elicit various customized information. In the embodiment being described, the customized information relates to company policies (such as personnel, property, health, safety and the like) and employment information, but it should be appreciated that the customized information could relate to other areas as well. For example, question No. 4 on questionnaire record 12 asks the user of the questionnaire record 12 a question regarding whether it desires to have a policy regarding temporary employees, in which case the user would check the "keep" box 16. Identifying a "keep" box 16 provides means for identifying those policies and/or provisions which the user wishes to include as part of its corporate policies. If a policy is not desired, then the user would mark the "delete" box 17.

After all the questions on the questionnaire record 12 have been completed, a system record generator 18 (FIG. 1) generates a customized policy set 20, at least one customized record form set 22 comprised of a plurality of record forms 22a and a customized record receiver 24 for receiving a plurality of customized record forms 22a.

Figure 5:
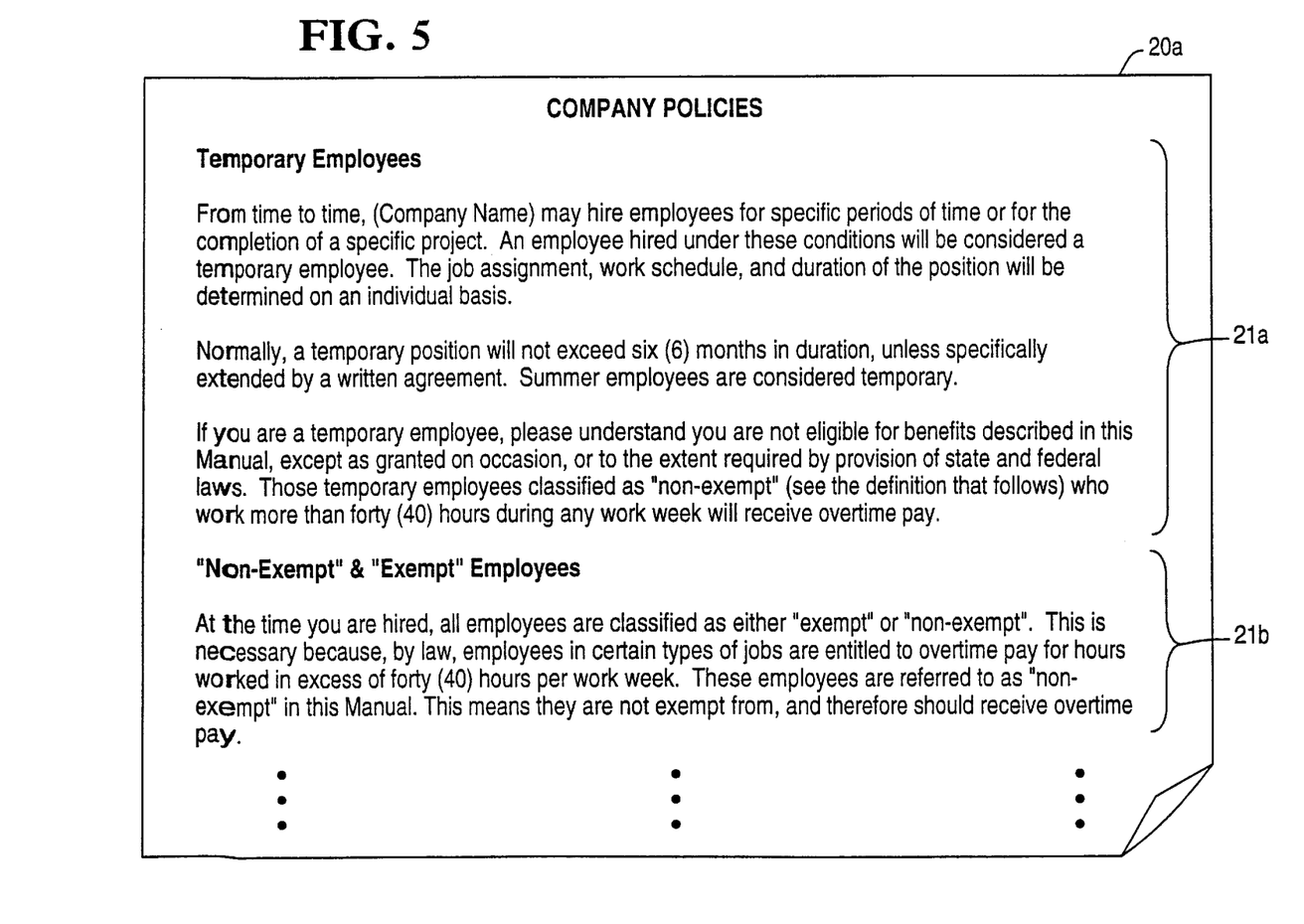
FIG. 5 is a portion of a policy situated in the policy manual shown in FIG. 3 showing a policy generated in response to a question on the manual questionnaire record of FIG. 2.

The customized policy set 20 comprises a plurality of policy sheets 20a (FIG. 5) comprising a plurality of policies, such as policies 21a and 21b, which are generated in response to the information on the questionnaire record 12. For example, after the user indicates that it was desirous of keeping a policy for defining a temporary employee by checking the keep box 16 (FIG. 2) on questionnaire record 12, then a corresponding customized policy 21a (FIG. 5) is generated by the system record generator 18.

Figure 11:
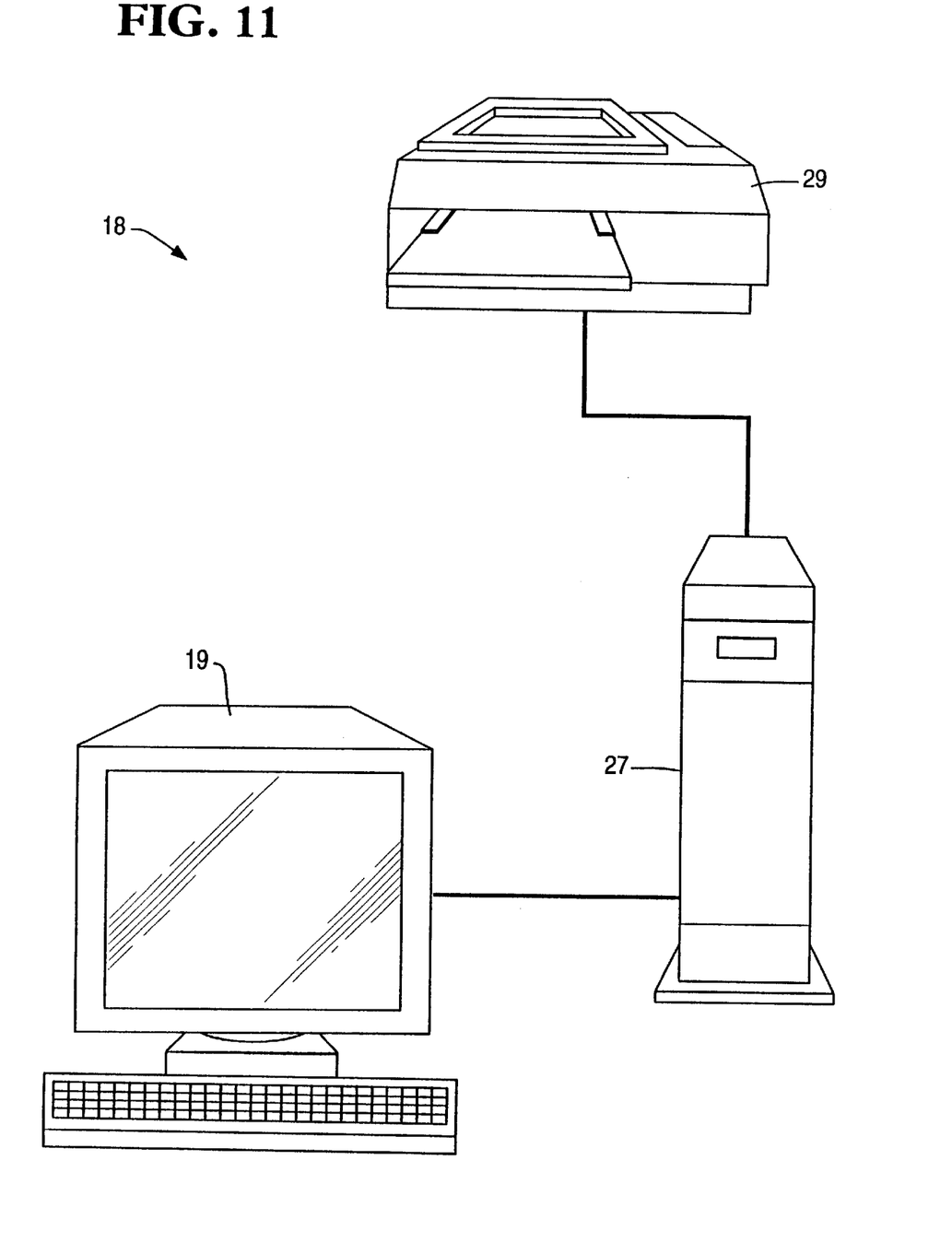
FIG. 11 shows a system record generator in accordance with one embodiment of the invention.

FIG. 11 illustrates components comprising the system record generator 18 in accordance with one embodiment of the invention. The system record generator 18 comprises a work station 19 which is coupled to a server 27 which, in turn, is coupled to a laser printer 29. In the embodiment being described the work station 19 may comprise an IBM compatible PC having a Windows NT™ or Windows 95™ operating system which are available from Microsoft Corporation. Suitable software, such as Microsoft Word™, which is also available from Microsoft Corporation, may be used to generate the various record forms 22a and policies 21a and 21b and the like.

The server 21 may comprise an IBM compatible PC which is also running a Windows NT server operating system available from Microsoft Corporation. The printer 23 may comprise a laser printer available from Hewlett Packard or any suitable device for printing the form set 22, record receiver 24 and various record forms 22a and policies 21a and 21b.

In the embodiment being described, a software template created in the Microsoft Word™ program may be stored in the server 27 and accessed by the work station 19. When a questionnaire record 12 is received, the template is accessed and opened using work station 19. Using various macros provided in Microsoft Word™, a color coding feature and basic Microsoft Word™ editing features, the template is adjusted to reflect the responses given in the completed questionnaire record 12. The template is then re-named and stored as a new and unique document on server 27. The document is thereafter printed in response to a print command sent from work station 19 to server 27 which then causes the laser printer 29 to print the document. Also, although not shown, the system record generator 18 may comprise a tape back-up for backing up information stored on the server 27.

Thus, it should be appreciated that system 10 provides means for generating the customized policy 20 comprising a plurality of policies 21a and 21b in response to the questionnaire record 12.

Figure 3:
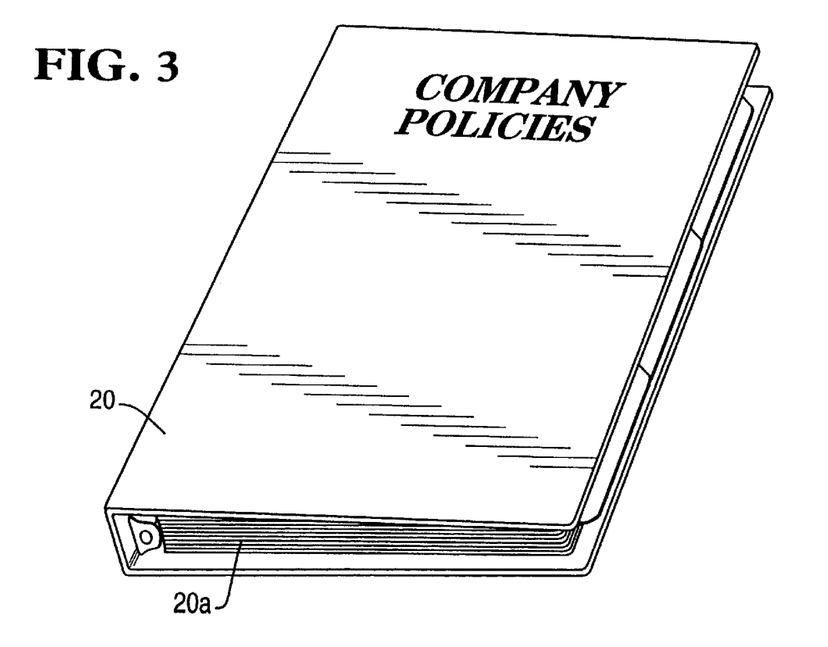
FIG. 3 is a view of a policy manual generated by a system record generator in response to the manual questionnaire record shown in FIG. 2.
Figure 4:
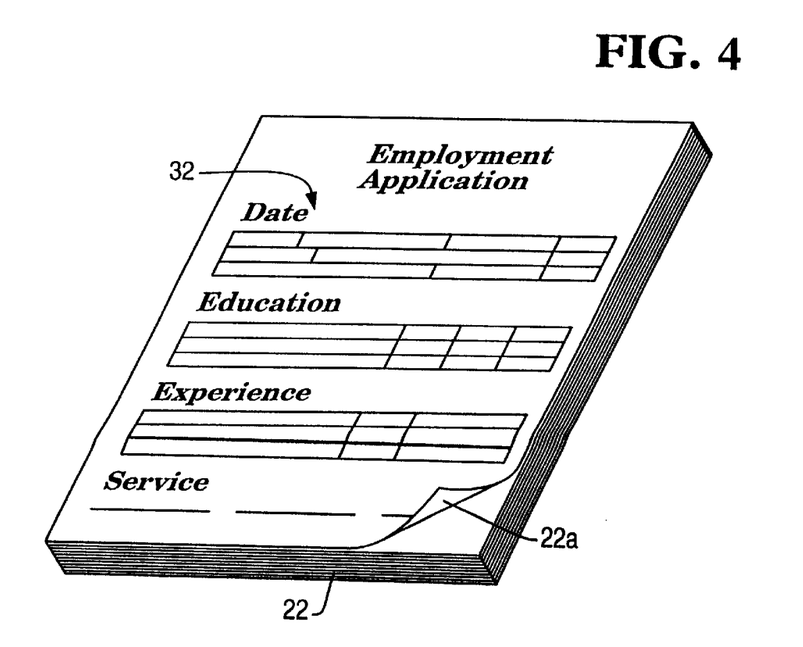
FIG. 4 is a kit or compilation of record forms generated by the system generator shown in FIG. 1.

After all questions on the record 12 have been completed and the customized policy set 20 (FIG. 3) is generated, then system record generator 18 may generate the plurality of record forms 22a comprising the customized record form set 22 (FIG. 4) in response to the questionnaire record 12. For example, if the user checks the "keep" box 30 (FIG. 2) corresponding to a question 6 regarding an employee's anniversary date, then not only would a corresponding policy be generated for the customized policy set 20, but a customized record from 22a, like the employment application 22a in FIG. 4, may be generated to have a corresponding area (such as area 32 in FIG. 4), for identifying the employee's anniversary date.

Thus, it should be appreciated that the system record generator 18 utilizes the questionnaire record 12 to generate a customized record form set 22. It should also be appreciated that the questionnaire record 12 may provide a listing (not shown) of all available forms from which the user may choose. The chosen forms may then be compiled and bound together to provide the customized record form set 22.

In the embodiment being described, each customized record form set 22 may be provided to provide a plurality of one type of form, such as an employment application; an absent, vacation, leave and warnings form; accident and injury form; termination form; COBRA form; insurance forms; safety forms; employment agreements; government forms and the like. Alternatively, a "kit" of forms, such as employment-related forms, may be provided. Note that the forms may be bound or stapled together as desired.

Figure 6:
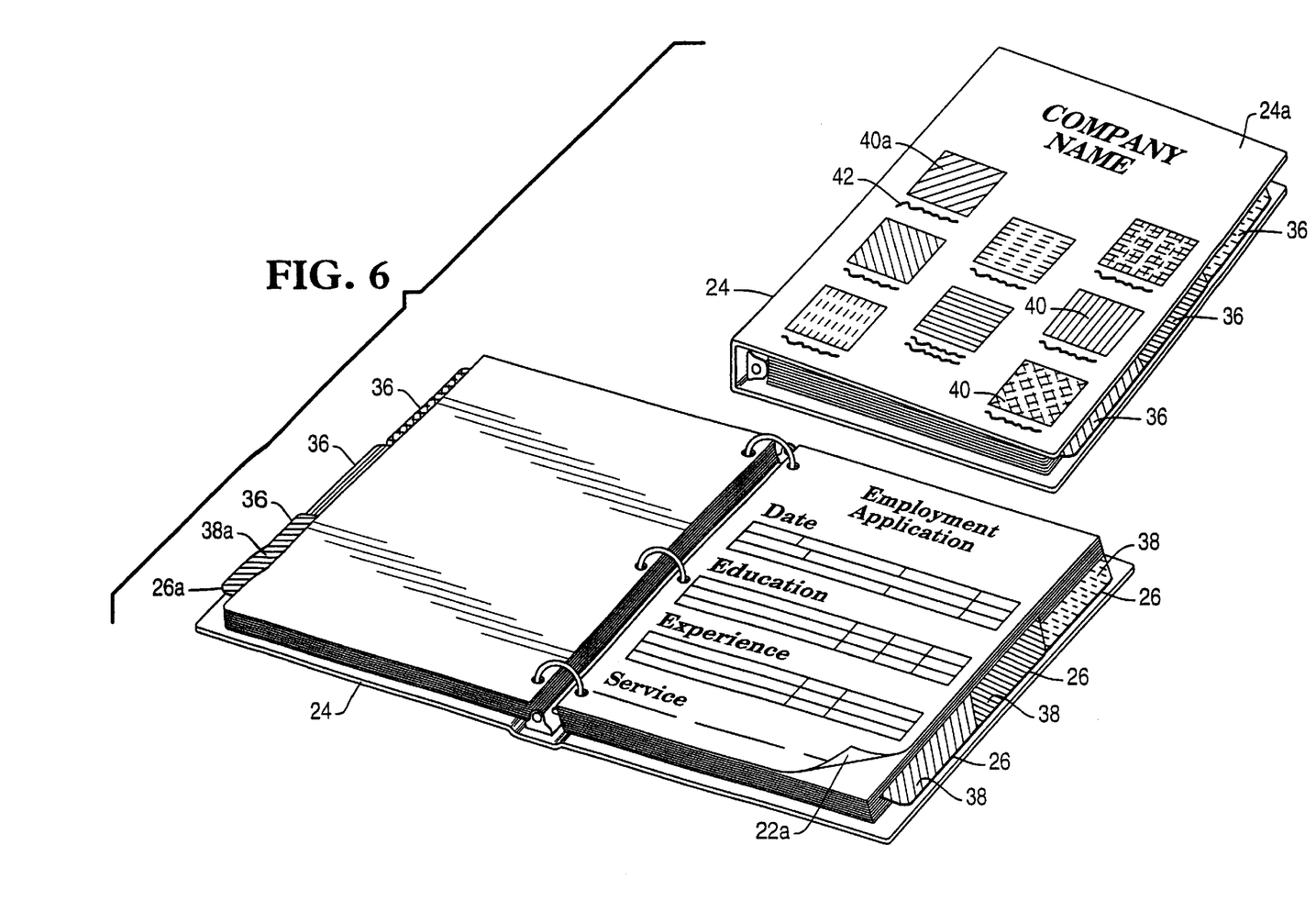
FIG. 6 is a view of a record receiver in a closed and an open position.

Once the customized policy set 20 and customized record from set 22 are generated, then various record forms 22a from a plurality of sets 22 (FIG. 4) may be assembled or compiled into a storage means, storage organizer or record receiver 24 (FIG. 6). In the embodiment being described, the record receiver 24 may comprise a binder or other suitable storage device. In this embodiment, the record receiver 24 comprises a cover 24a comprising a plurality of separators 26 for separating the various record forms 22a into a plurality of different compartments defined by the area between adjacent separators.

Notice that a plurality of indicia 40 (FIG. 1) are situated on cover 24a and correspond to indicia 38 used on the plurality of separators 36. For example, cover 24a may comprise indicia 38a (FIG. 6) which corresponds to indicia 40a on separator 26a.

The cover 24a may also comprise information 42 associated with each indicia 38a to facilitate correlating indicia 38a corresponding to a particular customized record form 22a, such as the employment application 22a.

Advantageously, the system and method of the present invention provides means for quickly organizing, inventorying, and identifying various customized record forms 22a, such as the employment application shown in FIG. 6, for easy use and referral. The record form receiver 24 may comprise any type desired customized record form 22a, and it should be appreciated that the indicia 38 and 40 could be any suitable means for identifying the separated forms. For example, the indicia 38 and 40 could comprise a plurality of colors, shades, art work or the like as may facilitate making the various separators 36 and corresponding customized record forms 22a easy to identify.

Figures 7, 8:
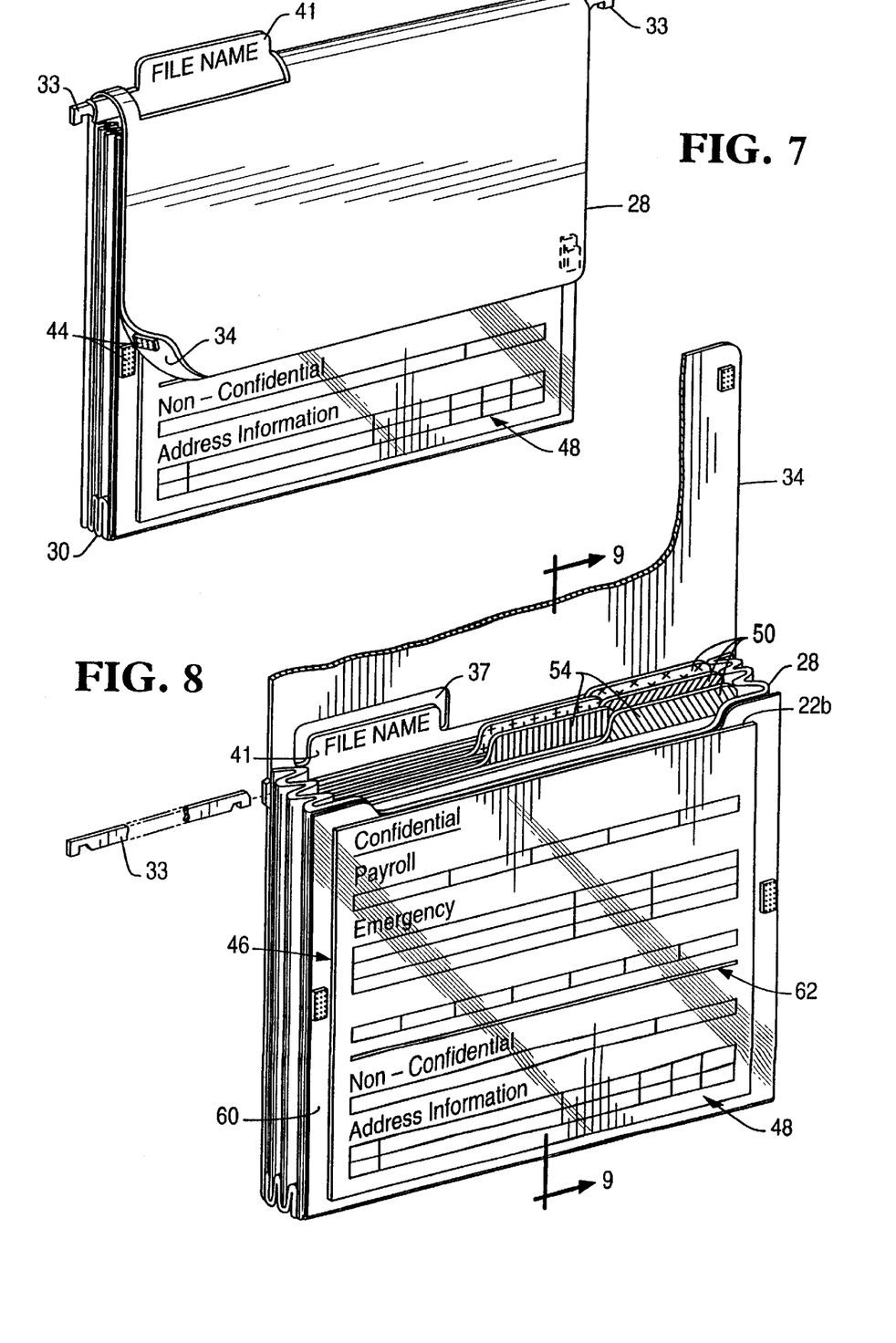
FIG. 7 is a view of a record holder shown with a cover in a closed position.
FIG. 8 is another view of the record holder shown in FIG. 7 showing the cover in an open position.
Figure 9:
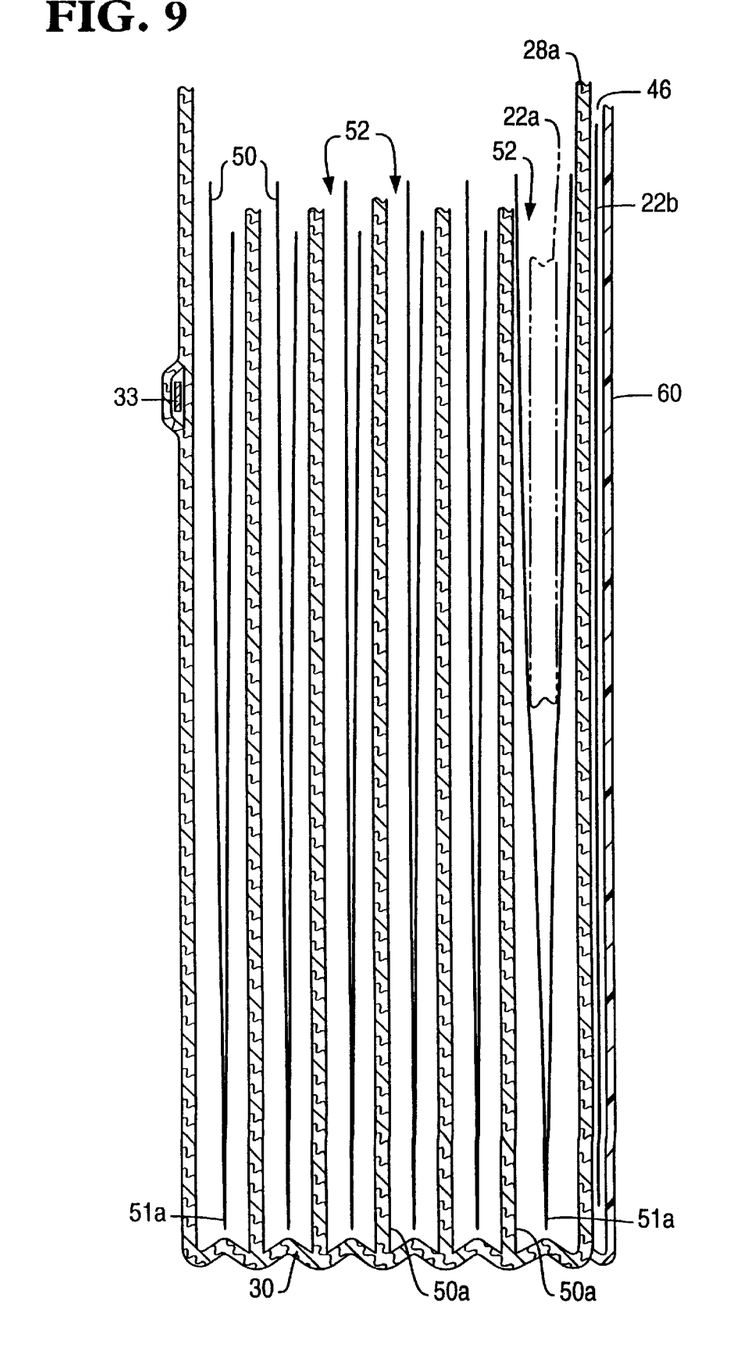
FIG. 9 is a cross-sectional view of the record holder shown in FIGS. 7 and 8.

Referring now to FIGS. 7–9, a record holder 28 is shown comprising a container 30 having a plurality of record form receiving areas 52 (FIG. 9). As best illustrated in FIG. 8, the container 30 also comprises a support 33 for supporting the record holder 28, for example, in a drawer (not shown) or file cabinet (not shown). The container 30 further comprises a cover 34 secured or integrally formed as part of the container 30. Notice that cover 34 further comprises an aperture 37 which facilitates revealing an indicia or identifier 41 when the cover 34 is in a closed position, as illustrated in FIG. 7.

Notice in FIG. 9 that the record holder 28 further comprises a plurality of separators 50 having indicia 54 thereon. In the embodiment being described, the indicia 54 correspond to the indicia 38 and 40 described above relative to the record receiver 24 (FIG. 6).

In the embodiment being described, the separators 50 may comprise separate wall dividers (such as walls 50a in FIG. 9) having the indicia 54 situated thereon. Alternatively, separators 50 may include separate removable folders 51a (as viewed in FIG. 9) or other means for separating the customized record forms 22a so that they are suitable for receiving and storing at least one of the record forms 22a. Notice that the indicia 54 (FIG. 8) correspond directly to the indicia 38 and 40 shown in FIG. 6 which provides means for easily identifying the record forms 22a prior to their use and also after they are used and stored in record holder 28. This facilitates providing a convenient form inventory and management system for keeping track of, accounting for, and managing the numerous record forms 22a that are used in a business. The indicia 54 may comprise color, marking, lettering, graphics and the like, as with the indicia 38 and 40. In the embodiment being described, the folders 51a themselves may be colored to provide or define the indicia 54.

The record holder 28 further comprises locking means or a lock 44 (FIG. 7) which, in the embodiment being described, may be VELCRO™, a string tie arrangement (not shown) or any suitable means for securing cover 34 in the closed position shown in FIG. 7.

The system and method of the present invention also comprises security means for concealing certain information, such as confidential information 46 (FIG. 8) while revealing non-confidential information, such as information 48. As best illustrated in FIGS. 8 and 9, the record holder 28 comprises a transparent sheet or cover 60 (FIG. 9) which cooperates with a wall 28a of record holder 28 to define a compartment 46 (FIG. 9) for receiving and storing a customized record form b. As best illustrated in FIG. 8, record form b comprises a confidential area 46, defined by the area above line 62, and a non-confidential area 48 defined by the area below line 62 (as viewed in FIG. 8). As illustrated in FIG. 7, when cover 34 is in the closed position shown in FIG. 7, the confidential information area 46 is covered, thereby concealing any information in the confidential area 46 of the record form b. Simultaneously, any information in the non-confidential area 48 is revealed.

It should be appreciated that the record holder 28 may be comprised of one receiving area 52 which is capable of receiving the plurality of record forms 22a and/or reusable folders in which the plurality of record forms 22a are situated.

It has been found that the record holder 28 is particularly suitable for use in an employment environment where it is important to maintain the confidentiality of some information, such as employment review information, payroll and wage information and the like, while revealing other non-confidential information, such as an employee's name and address. One method for utilizing the features of the present invention will now be described with respect to FIG. 10.

The method starts by completing the questionnaire record 12 (FIG. 1) at block 90. At decision block 92 (FIG. 10), it is determined whether or not the questionnaire record 12 is complete. If it is not, then the method loops back to block 90 as shown. If it is, then the method proceeds to block 94 where the customized policy 20 (FIG. 1) is generated by the system record generator 18 in a manner described earlier herein.

Figure 10:
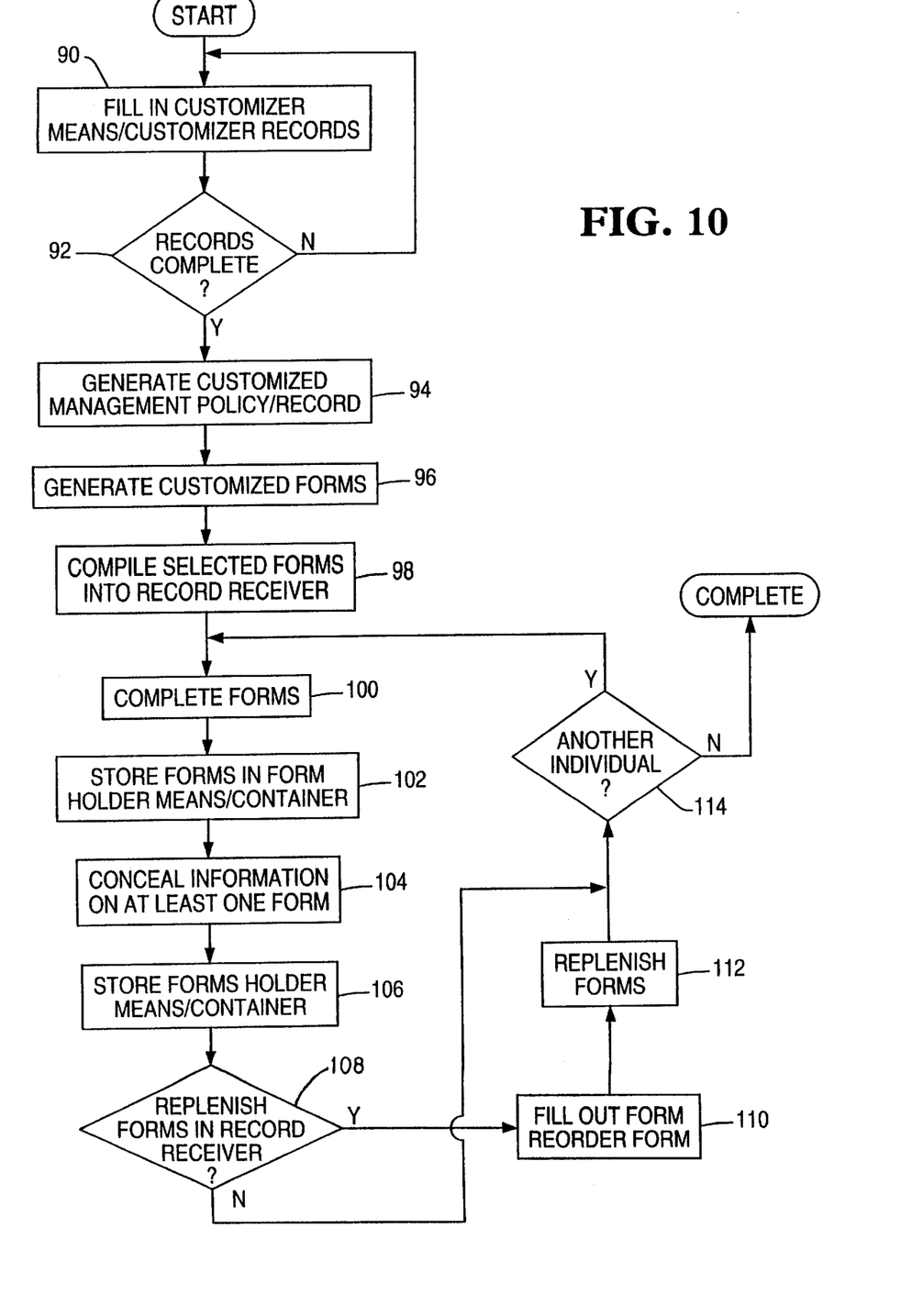
FIG. 10 is a schematic view of a method and process of the present invention.

The system record generator 18 generates the customized record set 22 at block 96 (FIG. 10). Selected customized record forms 22a from one or more sets are then compiled into the record receiver 24 (block 98 in FIG. 10).

Throughout the normal course of business, the record forms 22a may be removed from the record receiver 24 and completed (block 100) and, thereafter, stored in the record holder 29 (block 102).

When the cover 34 on container 30 is secured in the closed position, the confidential information area 46 on record form 22b may then be concealed (block 104).

At block 106, the record holder 28 may then be stored in any suitable storage, such as a file cabinet. At decision block 108, it is determined whether any of the record forms 22 utilized in the record receiver 24 need to be replenished. If they do, then a reorder form (not shown) may be situated in the record receiver 24 such that a user may easily reorder any missing forms 22 from a form supplier (not shown). In this regard, the user would fill out the reorder form (block 110 in FIG. 10) and send it to the supplier. At block 112, a replenishment supply of forms 22a is supplied for storing in and replenishing of the record receiver 24.

It should be appreciated that the record receiver 24 may provide or store a plurality of identical record forms 22 for use by multiple individuals. The record holder 28 shown in FIGS. 7–9 is suitable for retaining all record forms 22 associated, for example, with a single individual or entity. At decision block 114, it is determined whether record forms 22 for another individual need to be completed. If they do, then the method loops back to block 100 as shown. If they do not, then the process is complete. Notice that if the decision at decision 108 is negative, then the process loops to decision block 114 as shown.

Advantageously, this method and system provide means for generating customized policies and forms for use, for example, in a business. The system and method also provide means for collecting, inventorying and compiling the forms and subsequently storing the forms after their use. Further, the system and method provides means for easily identifying and separating the forms into convenient compartments and for ultimately storing the forms into coded areas after they are used so they can be easily identified by the user.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A record holder comprising:
   a container comprising at least a first removable separator for receiving a first employment form and a second removable separator for receiving a second employment form;
   a first indicia associated with both said first removable separator and said first employment form and a second indicia associated with said second removable separator and said second employment form;
   wherein said container comprises a record area for receiving employee information situated on an outside of said container.

2. The record holder as recited in claim 1 wherein said container comprises a lid moveable from an open to a closed position, said employee information being situated on said container such that at least a portion of said employee information is concealed when said cover is closed; said portion defining confidential employee information.

3. The record holder as recited in claim 2 wherein said lid is configured to permit at least one of said first or second indicia to be visible when said lid is in the closed position.

4. The record holder as recited in claim 1 wherein said container comprises a transparent sleeve which is secured to said container and which cooperates with said container to define a record pocket for receiving a record member comprising said employee information.

5. The record holder as recited in claim 4 wherein said at least a portion of said record member comprises an area for receiving employee wage data.

6. The record holder as recited in claim 1 wherein said first indicia comprises a color.

7. The record holder as recited in claim 1 wherein said second indicia comprises a second colored folder capable of storing a second form.

8. The record holder as recited in claim 1 wherein said record holder further comprises:
   a hanger situated on said container for hanging said record holder.

9. The record holder as recited in claim 1 wherein said cover further comprises:
   a lock for securing said cover in a closed position.

10. A form management system comprising:
    a system organizer comprising a plurality of form areas, each of said plurality of form areas being capable of receiving at least one form;
    a plurality of first indicia associated with said plurality of form areas, respectively;
    a record holder comprising a container having a plurality of separators also capable of receiving said at least one form;
    a second indicia associated with at least one of said plurality of separators; and
    a third indicia associated with said at least one form;
    said first, second and third indicia being substantially the same to facilitate selecting, organizing, inventorying and/or arranging said at least one form.

11. The form management system as recited in claim 10 wherein said plurality of separators are removable folders, having said second indicia thereon.

12. The form management system as recited in claim 10 wherein said first, second and third indicia define a color.

13. The form management system as recited in claim 10 wherein said container comprises information situated on an outside of said record member.

14. The form management system as recited in claim 13 wherein said container comprises a lid, said information being situated on said container such that at least a portion of said information is concealed when said cover is closed.

15. The form management system as recited in claim 13 wherein said at least a portion of said information comprises employee data.

16. The form management system as recited in claim 3 wherein said plurality of first indicia are coded to correspond to the coding of either said second or said third indicia.

17. The form management system as recited in claim 10 wherein said plurality of first indicia are coded to correspond to the coding of both said second or said third indicia.

18. The form management system as recited in claim 17 wherein said plurality of first indicia utilize colors.

19. The form management system as recited in claim 10 wherein said at least one of said plurality of form areas comprises a reorder form for facilitating replenishing an inventory of said at least one form.

20. The form management system as recited in claim 19 wherein said reorder form comprises a plurality of fourth indicia corresponding to said first, second or third indicia.

21. The form management system as recited in claim 20 wherein said plurality of fourth indicia and said first, second or third indicia comprise at least one color.

22. The form management system as recited in claim 20 wherein said first, second or third indicia comprise at least one of the following: a number, a letter or a color.

23. The form management system as recited in claim 10 wherein said plurality of separators comprises a colored folder capable of storing a first form.

24. The form management system as recited in claim 23 wherein said plurality of separators comprises a second colored folder capable of storing a second form.

25. A form management system comprising:
    a system organizer comprising a plurality of form areas, each of said plurality of form areas being capable of receiving at least one form;
    a plurality of first indicia associated with said plurality of form areas, respectively;
    a record holder comprising a container having a plurality of compartments also capable of receiving said at least one form;
    a second indicia associated within one of said plurality of compartments;
    a third indicia associated with another of said compartments; and
    a cover secured to said container for closing said plurality of compartments such that said second indicia is visible while said third indicia is concealed;
    wherein said container comprises a lid, said information being situated on said container such that at least a portion thereof is concealed when said cover is closed; and
    wherein said container comprises a transparent sleeve which is secured to said container and which cooperates with said container to define a record pocket for receiving said record member.

26. A file management system comprising:
    storage means for storing a plurality of forms into a predetermined order prior to use, said storage means comprising:

a plurality of separators for separating said plurality of forms;

a first plurality of indicia associated with said plurality of separators, respectively;

form holder means for holding at least one of said plurality of forms after use, said form holder means comprising:

a second plurality of separators for separating said some of said plurality of forms;

a second plurality of indicia associated with said second plurality of separators; and wherein said second plurality of indicia correspond to said first plurality of indicia;

at least one of said plurality of forms comprising at least one of said first or second plurality of indicia.

27. The file management system as recited in claim 26 wherein said form holder means comprises a container having a plurality of removable compartments for receiving said plurality of forms; said second plurality of indicia comprising:

a revealed indicia associated with one of said plurality of compartments;

a concealed indicia associated with another of said plurality of compartments;

wherein said revealed indicia becomes visible and said concealed indicia becomes concealed when said form holder means is sealed.

28. The file management system as recited in claim 27 wherein said form holder means comprises:

a cover secured to said container for closing said plurality of compartments such that said revealed indicia is visible while said concealed indicia is concealed.

29. The file management system as recited in claim 27 wherein said container comprises a record member situated on an outside of said container.

30. The file management system as recited in claim 29 wherein said container comprises a cover situated on said container such that at least a portion of record member is concealed when cover is closed.

31. The file management system as recited in claim 30 wherein said at least a portion of said record member comprises an area for receiving employee data.

32. The file management system as recited in claim 29 wherein said container comprises a transparent sleeve which is secured to said container and which cooperates with said container to define a record pocket for receiving said record member.

33. The file management system as recited in claim 26 wherein said first and second plurality of indicia are coded.

34. The file management system as recited in claim 26 wherein said first and second plurality of indicia are color coded to correspond to each other.

35. The file management system as recited in claim 26 wherein said first plurality of indicia are coded to correspond to said second plurality of indicia.

36. The file management system as recited in claim 35 wherein said first and second plurality of indicia comprises at least one color.

37. The file management system as recited in claim 26 wherein said storage means comprises a plurality of form areas; at least one of said plurality of form areas comprising a reorder form for facilitating replenishing an inventory of said at least one of said plurality of forms.

38. The file management system as recited in claim 37 wherein said reorder form comprises a plurality of indicia corresponding to said first plurality of indicia.

39. The file management system as recited in claim 26 wherein said first and second plurality of indicia facilitate identifying at least one of said plurality of forms stored in said storage means.

40. The file management system as recited in claim 26 wherein said system further comprises a kit comprising a plurality of forms, said kit comprising a kit identifier which corresponds to at least one of said first plurality of indicia.

41. The file management system as recited in claim 26 wherein said second plurality of indicia comprise a plurality of colored folders.

42. A form management system comprising:

a plurality of kits each comprising a plurality of forms, at least one of said plurality of kits comprising a form identifier associated therewith;

a storage device for organizing said plurality of forms into separate storage device compartments, at least one of said storage device compartments comprising a second form identifier associated therewith;

a record holder for organizing said plurality of forms into separate record holder compartments, at least one of said record holder compartments comprising a third form identifier associated therewith;

said form identifier, said second form identifier and said third form identifier comprising at least one common characteristic.

43. The form management system as recited in claim 42, wherein said at least one common characteristic comprises a color.

44. The form management system as recited in claim 42 wherein said record holder compartments receives at least one folder.

45. The form management system as recited in claim 44 wherein said at least one folder is colored to define said third form identifier.

46. A form management system comprising:

a plurality of kits each comprising a plurality of forms, at least one of said plurality of kits comprising a form identifier associated therewith;

a storage device for organizing said plurality of forms into separate storage device compartments, at least one of said storage device compartments comprising a second form identifier associated therewith;

a record holder for organizing said plurality of forms into separate record holder compartments, at least one of said record holder compartments comprising a third form identifier associated therewith;

said form identifier, said second form identifier and said third form identifier comprising at least one common characteristic;

wherein said third form identifier comprises a plurality of form indicia for identifying said plurality of forms, said record holder comprising a lid for concealing at least one of said plurality of form indicia when said lid is closed.

47. A form management system comprising:

a plurality of kits each comprising a plurality of forms, at least one of said plurality of kits comprising a form identifier associated therewith;

a storage device for organizing said plurality of forms into separate storage device compartments, at least one of said storage device compartments comprising a second form identifier associated therewith;

a record holder for organizing said plurality of forms into separate record holder compartments, at least one of said record holder compartments comprising a third form identifier associated therewith;

said form identifier, said second form identifier and said third form identifier comprising at least one common characteristic;

wherein said record holder comprises record information situated outside said record holder, said form holder comprising a lid for concealing at least a portion of said record information when said lid is closed.

48. A data management system comprising:

a customized record data item for receiving customized record data corresponding to customized information selected by a user;

a generator for generating a customized information set in response to said customizer record data item from record information items stored on a computer; and said customized record data item comprising a questionnaire comprising a plurality of record information selection areas for permitting a user to selectively choose said customized record data items, said generator generating said customized information set in response to said selections chosen by said user using said questionnaire.

49. The data management system as recited in claim 48 wherein said customized information comprises at least one personnel, property, health or safety policy information.

50. The data management system as recited in claim 48 wherein said customized record data item comprises a questionnaire record.

51. The data management system as recited in claim 50 wherein said questionnaire record comprises at least one area for permitting said user to identify customized information which will either be or not be included in said customized policy.

52. The data management system as recited in claim 48 wherein said record receiver comprises a reorder record for reordering at least one of said plurality of customized record forms.

53. The data management system as recited in claim 48 wherein said generator further generates a plurality of forms in response to said questionnaire.

54. The data management system as recited in claim 53 wherein said plurality of forms comprises a second plurality of indicia corresponding to said plurality of indicia.

55. The data management system as recited in claim 54 wherein said first and second plurality of indicia define at least one color, number or letter.

56. The data management system as recited in claim 53 wherein said system comprises a record holder having a plurality of separators for receiving said plurality of forms.

57. The data management system as recited in claim 56 wherein said plurality of separators comprise a third plurality of indicia corresponding to said plurality of indicia.

58. The data management system as recited in claim 57 wherein said plurality of indicia and said third plurality of indicia comprise at least one color.

59. The data management system as recited in claim 48 wherein said generator generates a company policy manual in response to said questionnaire.

60. The data management system as recited in claim 48 wherein said plurality of records comprise a plurality of provisions.

61. The data management system as recited in claim 48 wherein said customized information set comprises a plurality of records which are provided in the order selected by said user on said questionnaire.

62. A data management system comprising:

a customizer record data item for receiving customized record data;

a generator for generating a customized management record and a plurality of customized record forms in response to said customizer record data item; and a record receiver comprising a plurality of receiving areas for receiving said customized record forms and for organizing said plurality of customized record forms into a predetermined order, said plurality of receiving areas having a plurality of indicia associated therewith; and a record holder for receiving said plurality of customized record forms and for organizing them into a predetermined order;

said record holder comprising an associated second plurality of indicia corresponding to said first plurality of indicia;

wherein said record holder comprises a cover for concealing some of said second plurality of indicia while permitting other of said second plurality of indicia to be revealed.

63. A data management system comprising:

a customizer record data item for receiving customized record data;

a generator for generating a customized management record and a plurality of customized record forms in response to said customizer record data item; and a record receiver comprising a plurality of receiving areas for receiving said customized record forms and for organizing said plurality of customized record forms into a predetermined order, said plurality of receiving areas having a plurality of indicia associated therewith; and a record holder for receiving said plurality of customized record forms and for organizing them into a predetermined order;

said record holder comprising an associated second plurality of indicia corresponding to said first plurality of indicia;

wherein said record holder comprises a transparent sheet for receiving one of said customized record forms such that at least some information of one of said customized record forms is revealed.

\* \* \* \* \*